United States Patent Office 2,915,652
Patented Dec. 1, 1959

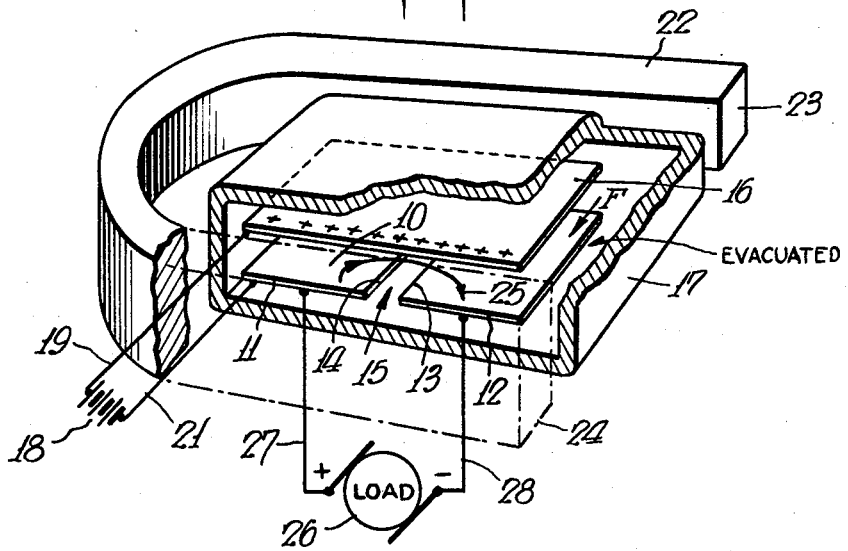
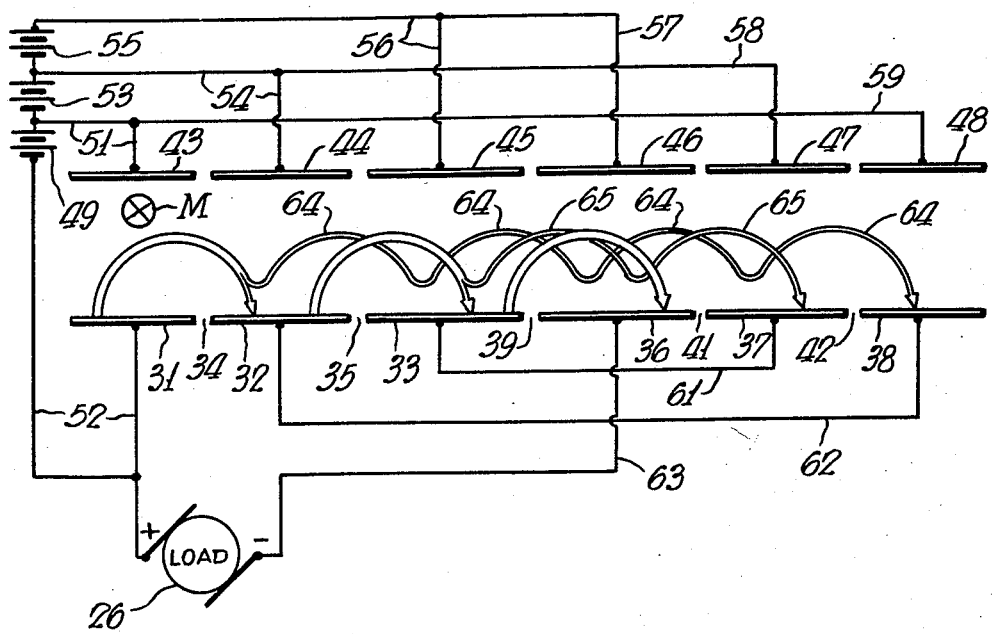

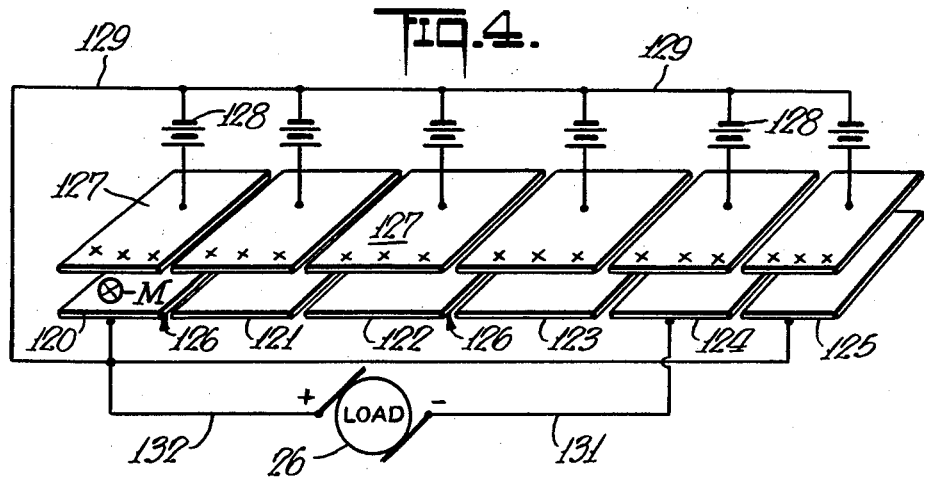
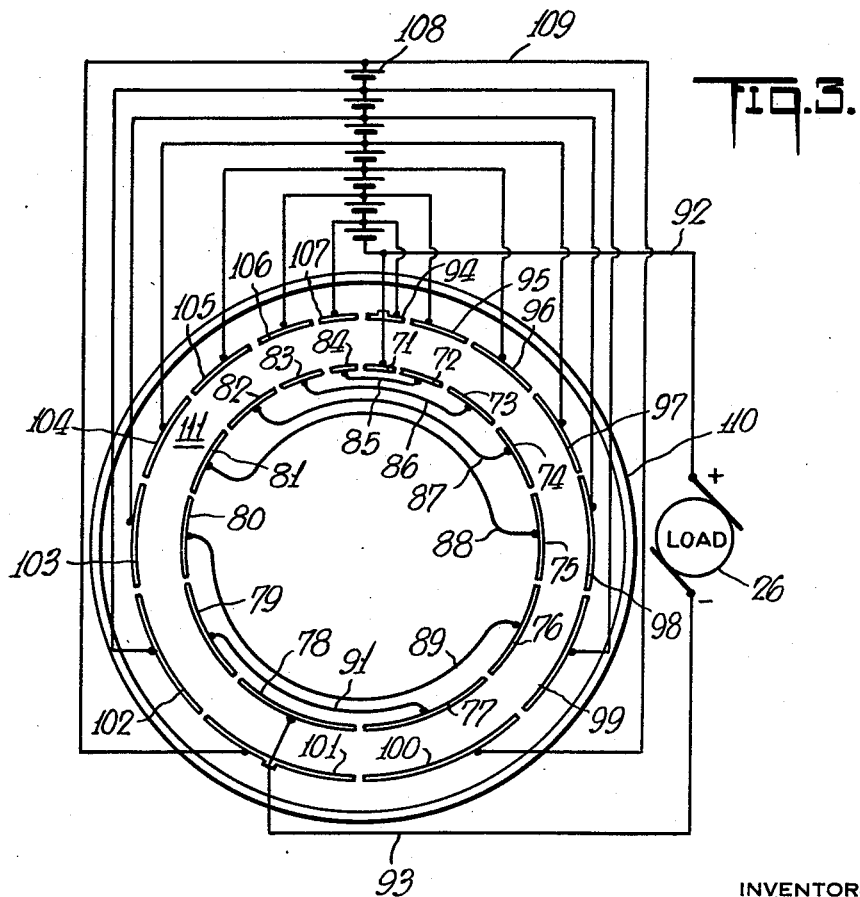

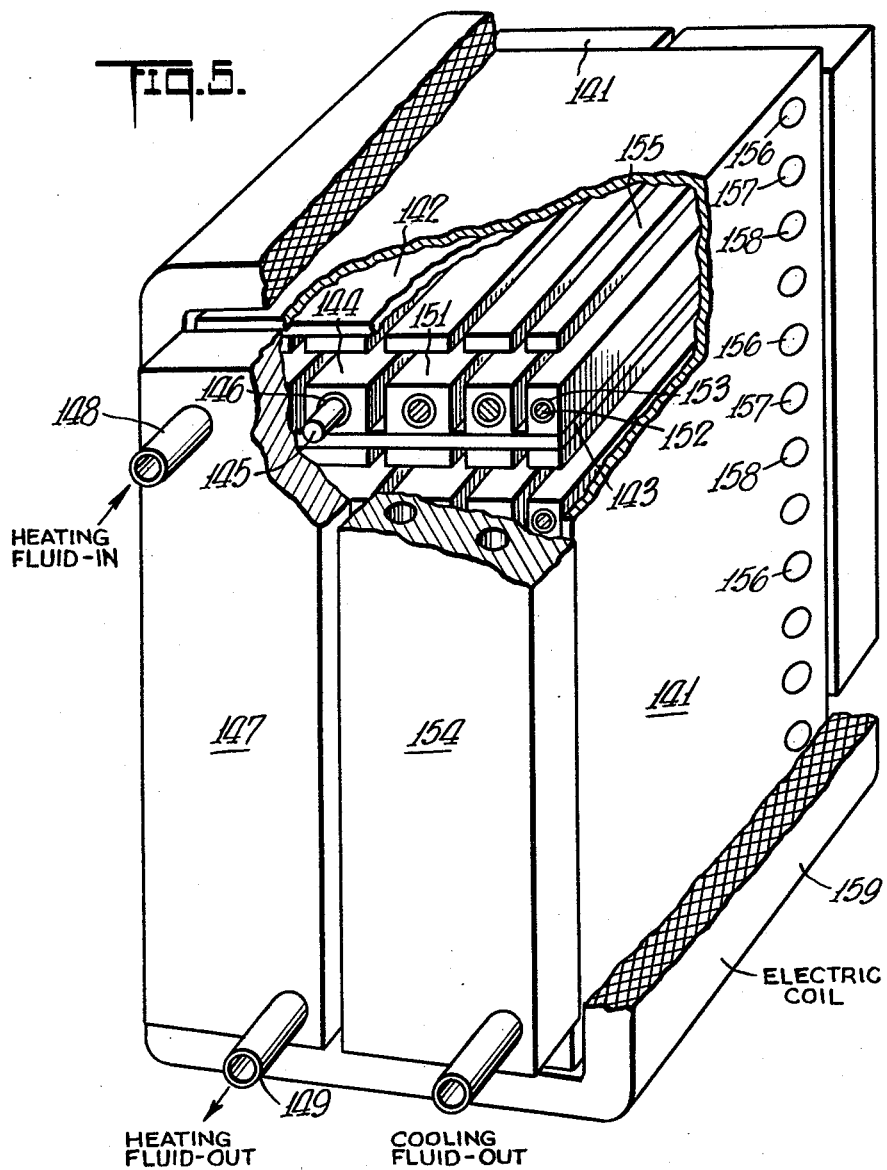

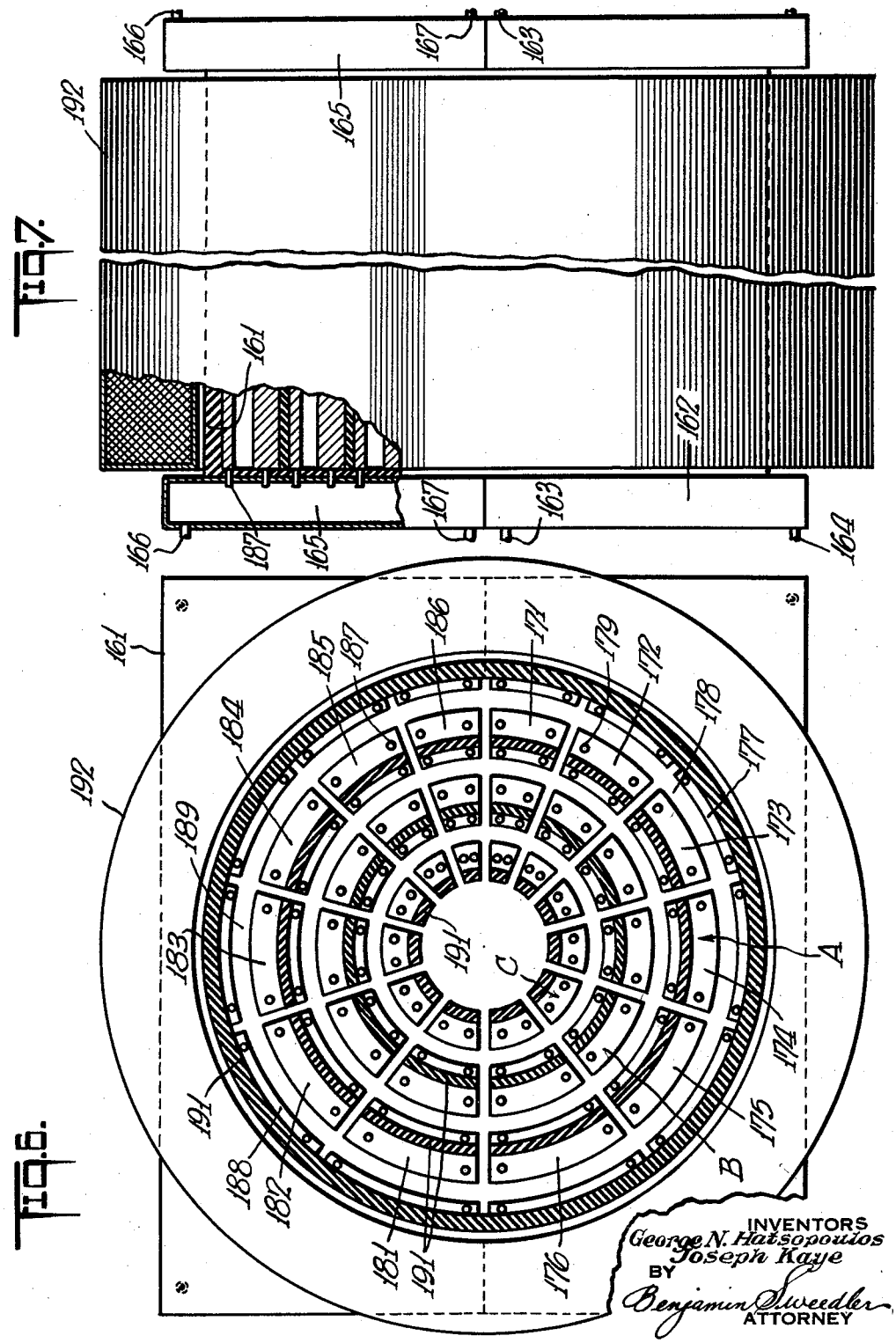

2,915,652

CONVERSION OF THERMAL ENERGY INTO ELECTRICAL ENERGY

George N. Hatsopoulos, Lexington, and Joseph Kaye, Brookline, Mass., assignors, by mesne assignments, to Thermo Electron Engineering Corporation, a corporation of Massachusetts Application April 18, 1956, Serial No. 578,948

27 Claims. (Cl. 310—4)

This invention relates to processes and apparatus for converting thermal energy into electrical energy, and more particularly to processes and apparatus which do not require any moving mechanical parts for effecting such conversion.

The use of turbogenerators, steam power plants, internal combustion engines, ionized gas or vapor media, thermocouples or thermopiles, as instrumentalities for effecting the conversion of thermal energy into electrical energy, is, of course, well known. These heretofore known techniques for converting thermal energy into electrical energy have certain disadvantages, among the more important of which may be mentioned:

Turbogenerators, steam power plants, internal combustion engines, etc. involve expensive boilers, complex auxiliary equipment and controls which necessitate a heavy initial investment, and are expensive to maintain and operate. Techniques involving ionized gaseous or vapor media require the continuous operation of large vacuum pumps which are expensive to install, maintain and operate. While the use of thermocouples or thermopiles eliminates the necessity of using mechanically moving parts, they have the disadvantages of being relatively inefficient in operation and yielding relatively low voltages per unit weight and/or volume of equipment.

It is among the objects of the present invention to provide processes and apparatus for converting thermal energy into electrical energy, which processes and apparatus are relatively efficient in that they give large power outputs per unit weight and/or volume of equipment and which are relatively inexpensive to install, maintain and operate, particularly in that they do not involve any mechanically moving parts.

It is another object of this invention to provide processes and apparatus for converting thermal energy into electrical energy which result in high current densities, high power densities and high thermal efficiencies.

Still another object of this invention is to provide processes and apparatus for converting thermal energy into electrical energy in which voltage-multiplication effects are obtained with consequent increase in the voltage output and/or power output and thermal efficiency of such converters.

Still another object of the present invention is to provide such converters which are simple in construction and of relatively low cost in that they are substantially devoid of intricate parts so that no precision machining is necessary.

Still another object of the present invention is to provide such converters which in operation require little or no supervision, and, hence, result in a saving in labor required for their operation.

Still another object of the present invention is to provide such converters which can utilize directly any available high temperature source, resulting in high Carnot efficiency.

Still another object of the present invention is to provide such converters which are particularly adapted to utilize the heat generated in nuclear reactions to convert such heat into electrical energy. Hence, this embodiment of the present invention is particularly applicable for use as nuclear power plants.

Still another object of the present invention is to provide such converters which can operate at temperatures much higher than those which can be used in commonly available thermocouples or thermopiles and with considerably higher efficiencies than is obtainable in such commonly available thermocouples or thermopiles.

Still another object of the present invention is to provide such converters which produce relatively high voltages per unit volume and/or weight of equipment.

Still another object of the present invention is to provide such converters which are capable of operating efficiently for relatively long periods of time, i.e., have relatively long life.

Another object of the present invention is to provide such converters which can utilize an A.C. current source as the heating medium and result in the production of D.C. current with zero ripple and with any voltage, within practical limits. Hence, this embodiment of the invention provides an excellent and relatively inexpensive rectifier for converting alternating to direct current.

Still another object of the present invention is to provide such converters which utilize a D.C. current source at a given voltage as a source of heat to produce D.C. current with zero ripple and at any desired voltage, within practical limits.

Other objects and advantages of this invention will appear from the following detailed description thereof.

In accordance with this invention, thermal energy is converted into electrical energy by employing any available heat source to heat one or more electron emissive surfaces spaced from one or more additional electron emissive surfaces maintained at a lower temperature than the heated surface or surfaces, creating crossed electrostatic and magnetic fields in the region of these surfaces so that a controlled flow of electrons takes place from the heated surface or surfaces to the surface or surfaces at a lower temperature and thus producing D.C. current.

For a fuller understanding of the nature and objects of the invention, reference should be had to the following detailed description taken in connection with the accompanying drawings showing, for purposes of exemplification, preferred forms of this invention without limiting the claimed invention to such illustrative instances, and in which:

Figure 1 is a perspective view, partly broken away to show the interior structure, of an embodiment of this invention involving a relatively simple arrangement of hot and cold electron emissive surfaces capable of generating relatively low voltages;

Figure 2 is a diagrammatic view of another and a preferred embodiment of the invention in which voltage-multiplication effects are obtained;

Figure 3 is a diagrammatic view showing a preferred embodiment of the invention in which the electron emissive surfaces and the associated anodes are arranged in concentric arcs within a cylindrical housing;

Figure 4 is a diagrammatic view of still another embodiment of the invention in which the electron emissive surfaces are maintained at gradually decreasing temperatures with the first (that at the left hand side of this figure) electron emissive surface of the series shown being at the highest temperature and the last at the lowest temperature;

Figure 5 is a perspective view, partly broken away to show the interior structure, of a preferred embodiment of the invention in which groups of series of electron emissive surfaces and associated anodes are disposed in a housing of parallelepiped shape provided at opposite ends with pairs of headers for supplying heating and cooling media to the respective hot and cold electron emissive surfaces;

Figure 8:
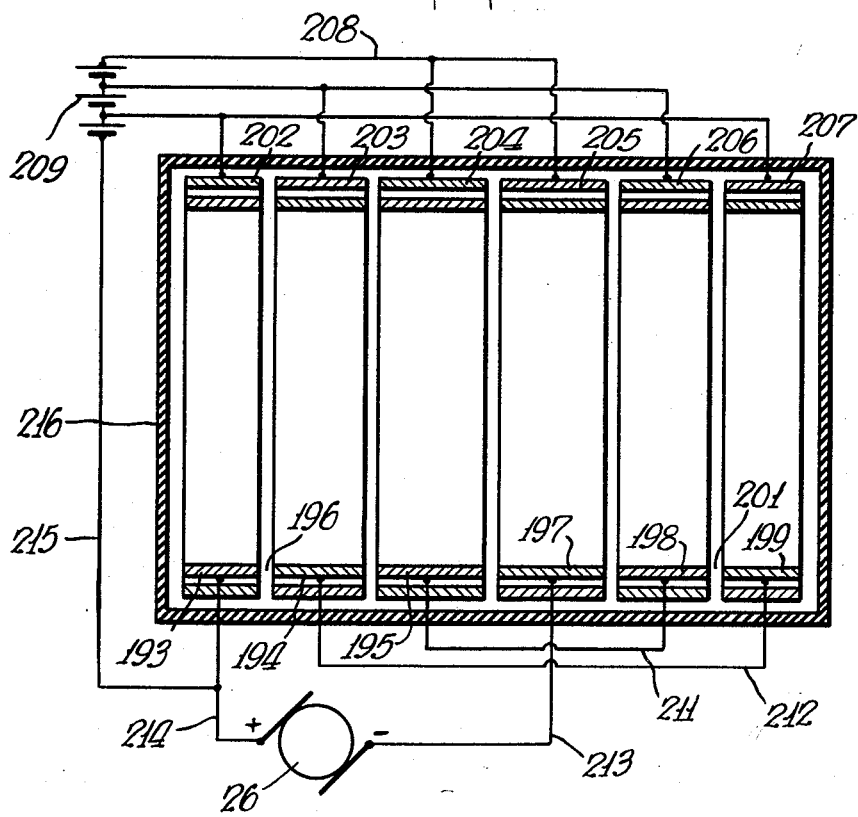

Figure 6 is partly an elevation and partly a vertical section through a modification of the invention in which the electron emissive surfaces and the associated anodes are arranged in groups with the series of electron emissive surfaces of each group and the associated anodes disposed in arcs, the electron emissive surfaces and associated anodes of each group being arranged concentrically with respect to those of the other groups and all of the groups being disposed within a cylindrical housing provided at its opposite ends with pairs of headers for supplying the heating and cooling media to the respective hot and cold electron emissive surfaces;

Figure 7 is a side elevation, partly broken away to show the interior structure thereof, of the embodiment of the invention shown in Figure 6; and Figure 8 is a vertical section through still another embodiment of the invention in which the electron emissive surfaces and the associated anodes are in the form of rings and are disposed within a cylindrical housing.

The embodiment of Figure 1 of the drawings may be used, for example, for generating relatively low voltages of the order of a few volts. This embodiment of the invention involves an electron emissive surface 10 in the form of a plate 11 heated, for example, by the hot gases exhausted from an automotive vehicle or any other suitable heat source disposed to transfer heat to the plate 11. Positioned contiguous to the plate 11, which will hereinafter be referred to as the hot plate, is a second electron emissive surface 12, hereinafter referred to as the cold plate. Plate 12 is positioned in the same horizontal plane as hot plate 11 and has its side edge 13 parallel to and spaced from side edge 14 by space 15. Space 15 preferably is of a width equal to a small fraction, of the order of 1/10, of the width of the hot plate 11, which is of the same width as that of the cold plate 12.

Plates 11 and 12 may be from about 1/16 to about 1/2 inch wide, of any desired length depending on the material, e.g., about 6 inches, the exact length depending on the current desired, and of any desired thickness, e.g., about 1/4 inch. Positioned above plates 10 and 12 is anode 16, which is dimensioned so that it just completely overlies the area of the plates 11 and 12 and the intervening space 15. Anode 16 is positioned above the surfaces of plates 11 and 12 a distance such that electrons flowing from hot plate 11 to cold plate 12 under the influence of a unidirectional magnetic field hereinafter described will not reach the under surface of anode 16. This distance is somewhat greater than the width of hot plate 11 divided by $2\pi$.

Hot plate 11, cold plate 12 and the superimposed anode 16 are enclosed within a sealed container 17 of any suitable material which will permit a magnetic field to pass therethrough. This container, which, for example, may be of metal, such as non-magnetic steel, is evacuated before it is sealed. The higher the vacuum, the better; good results are obtained with vacuum of the order of $10^{-5}$ mm. of mercury.

A positive potential is impressed on the anode 16, for example, by a battery 18 which is connected to the anode 16 by a conductor 19 and to the hot plate 11 by a conductor 21. The positive potential thus impressed on the anode 16 creates an electrostatic field in the region above the hot plate 11 and the cold plate 12, which electrostatic field accelerates the electrons leaving hot plate 11. A magnet 22, which, in the embodiment shown in Figure 1 of the drawings is in the form of a permanent magnet, is positioned so that the opposite poles 23, 24 of this magnet are disposed on opposite sides of the housing 17 creating magnetic flux lines in the direction indicated by the arrow F on Figure 1. Under the influence of this magnetic field the electrons are deflected and flow from hot plate 11 to the cold plate 12 in a generally elongated cycloid trajectory, as indicated by the arrows 25 on Figure 1.

A load 26, diagrammatically indicated in Figure 1, is in circuit with the hot plate 11 and cold plate 12 through conductors 27 and 28, respectively, which conductors extend through the housing 17 through suitable electrical insulation and make suitable electrical contact with these plates.

While in the embodiment shown in Figure 1 the magnetic field is supplied by a permanent magnet which consumes no power, an electromagnet may be used consuming a small fraction of the power output of the device. Instead of a battery to produce the electrostatic field, a D.C. generator may be used. If desired, a small portion of the power output of the device may be used to create the electrostatic field.

The battery 18 used to maintain a positive potential on the anode 16 will consume zero power if zero electrons reach the anode 16, or if no current flows from the hot plate 11 to the anode 16. While this condition is theoretically possible, practically, however, a very small current, usually of the order of 0.001 to 0.0001 of the load current, will flow to the anode 16 chiefly due to electron collisions with gas molecules even at the highest vacuum attainable and reflections of electrons from the cold plate 12. Electron emission from cold plate 12 will be negligible for values of cold plate temperatures which are well above atmospheric temperature, say as high as 500° F.

The power output obtained from the embodiment of the invention shown in Figure 1 will depend chiefly on the dimensions of the hot and cold plates and of the associated anode, the anode potential and the temperature at which the hot plate is maintained. Electrons emitted from hot plate 11 will reach cold plate 12 having an average kinetic energy of the order of $2kT_1$, in which $k$ is Boltzmann constant in electron volts per degree absolute and $T_1$ is the temperature in degrees absolute of the hot plate 11. After the hot plate attains its final steady state temperature, electrical steady state operation is achieved almost instantaneously and current will flow through the load 26 which is maintained at a potential difference of the order of $2kT_1$ in which $k$ and $T_1$ have the values above indicated. The power generated by this embodiment of the invention is of the order of from 0.1 to 1 watt per square centimeter of electron emission surface of the hot plate, or from 0.1 to 1 kilowatt per square foot of such surface of the hot plate.

The embodiment of the invention of Figure 2 involves multiplication effects of the voltage generated. It further involves a reduction of heat losses and a reduction of undesirable anode current per unit of hot plate electron emissive surface, as compared with the operation taking place in the apparatus of Figure 1, as will be explained more fully hereinafter. In the interests of clarity of illustration the sealed housing under high vacuum in which the electron emission surfaces are maintained is not shown. The unidirectional magnetic field in the region of the electron emissive surfaces is created by an electric coil, the flux direction of which is indicated by M. This field may be produced by a permanent magnet, as in the case of Figure 1, or by a coil through which direct current flows. When a coil is used, it completely surrounds the housing in which the electron emissive surfaces are disposed and is positioned to produce magnetic flux lines in a direction normal to the direction of the electrostatic field produced by the anodes hereinafter described throughout the entire region of the hot and cold plates and parallel to the edges of the plates defining the spaces 34, 35, 39, 41 and 42 hereinafter described.

In the embodiment shown in Figure 2, a series of electron emissive surfaces of any desired number depending on the desired voltage is employed. In the embodiment shown in Figure 2, three such electron emissive surfaces in the form of plates 31, 32 and 33 are shown. These plates are of gradually increasing width, plate 33 being the widest and 31 the narrowest. Plate 31 is separated from plate 32 by space 34; the adjacent edges of plates 31 and 32 are substantially parallel. Similarly, plate 32 is separated from plate 33 by a space 35 and the adjacent edges of plates 32 and 33 are substantially parallel. These plates may be of any length and thickness. Their width is graduated, as disclosed above. The preferred width of the wider plates for any given width of the narrowest plate is given hereinafter. Spaces 34 and 35 are each of the width the same as disclosed above for space 15 shown in Figure 1. Plates 31, 32 and 33 are maintained at an elevated temperature by any suitable heat source.

A series of cold plates 36, 37 and 38 having electron emissive surfaces are positioned spaced from the first-mentioned series 31, 32 and 33 by a space 39 which separates plate 36 from plate 33. Plate 37, the second plate of the series of cold plates, is separated from plate 36 by space 41 and plate 38 from plate 37 by space 42. Plates 36, 37 and 38 are of gradually decreasing width, plate 36 being the widest and having about the same width as plate 33, and plate 38 being the narrowest and having about the same width as plate 31. Intermediate cold plate 37 has about the same width as hot plate 32. The cold plates 36, 37 and 38 may be subjected to any suitable cooling medium to maintain the desired temperature differential between the hot and cold plates.

The electron emissive surface of both the hot and cold plates should be disposed in the same plane.

Associated with each of the plates 31, 32, 33, 36, 37 and 38 are anodes 43, 44, 45, 46, 47 and 48, respectively. Each anode preferably has about the same dimensions as the plate with which it is associated, thus anode 43 has about the same dimensions as hot plate 31, anode 44 about the same dimensions as hot plate 32, etc. These anodes are positioned above their respective plates, in the form of the invention shown in Figure 2, a distance the same as the spacing between anode 16 and the plates 11 and 12 of Figure 1 hereinabove described. As in Figure 1, the hot and cold plates and associated anodes are disposed in a sealed container under vacuum.

A positive potential is impressed on anode 43 by a battery 49 which is connected with this anode through conductors 51. Battery 49 is also connected with the plate 31 through conductors 52. A greater potential is impressed on anode 44 through batteries 49, 53 which are connected to the anode 44 through conductors 54. A still greater potential is impressed on the anode 45 through batteries 49, 53 and 55 which are connected to the anode 45 through conductors 56. Anode 46 has impressed thereon the same potential as anode 45 from the batteries 49, 53, 55 through conductors 56, 57. Anode 47 has the same potential impressed thereon as anode 44 from the batteries 49, 53 through conductor 58. Anode 48 has the same potential impressed thereon as anode 43 from the battery 49 through conductor 59. While in the embodiment of Figure 2 a plurality of batteries is used to impress the different potentials on the different anodes, the same effect of varying the electrostatic field strength from anode to anode can be obtained by using one battery to impress the potential on all anodes and properly varying the spacing between the anodes and the electron emissive surfaces with which they are associated.

Electron emissive plates 33 and 37, which are at the same negative potential, are interconnected by a conductor 61; plates 32 and 38 at the same negative potential are interconnected by conductor 62. A conductor 63 leads from plate 36 and with conductor 52 leading from plate 31 forms a circuit in which the load 26 is disposed.

In operation, the hot plates 31, 32 and 33 are maintained at a steady high temperature $T_1$ utilizing any available source of heat, as hereinafter more fully described.

The cold plates 36, 37 and 38 are maintained at a steady low temperature, if desired, by passing suitable cooling medium in heat exchange relation therewith. Starting with the first hot plate 31 at a potential of zero, the electrons emitted by this plate are controlled by means of the crossed electrostatic and magnetic fields, so that they flow toward the adjacent hot plate 32 at a higher negative potential of $-V_1$ at a rate of I amperes. The current of I amperes approaching the second hot plate 32 from the first hot plate 31 is partly absorbed and partly rejected by the second hot plate 32. The fraction, $rI$ ($r$ equals the reflection coefficient) is rejected and moves in a controlled series of paths or trajectories, as indicated diagrammatically at 64 on Figure 2, to the final cold plate 38 at the same potential as that of the second hot plate 32. The other fraction of the electron current, namely $(1-r)$ is absorbed by the second hot plate 32.

The emission of a current of I amperes occurs also in the second hot plate 32 and this current is now directed towards the third hot plate 33 at a potential of $-(V_1+V_2)$ volts; again this current of I amperes is split at the third hot plate 33 into a rejected fraction, $rI$, and an absorbed fraction, $(1-r)I$. The rejected fraction is indicated diagrammatically on Figure 2 by the reference numeral 65, and it will be noted that this fraction is absorbed by the cold plate 37, which is at the same negative potential as the hot plate 33.

From the last hot plate 33, at a potential of $-(V_1+V_2)$ volts, the series of cold plates 36, 37 and 38 begin. These cold plates are at such low temperature that their thermal rate of electron emission is insignificant. The electron current of I amperes from the third hot plate 33 is directed to the first cold plate 36 at a higher negative potential of $-(V_1+V_2+V_3)$. Thus, the first cold plate 36 from which conductor 63 leads is at the maximum negative potential.

All the rejected electrons from the first two hot plates 31 and 32 approach the first cold plate 36, but are substantially completely rejected by this first cold plate 36. Hence, the only current absorbed by the first cold plate 36 is I amperes. The rejected currents of the first two hot plates 31 and 32 approach the second cold plate 37 at a potential of $-(V_1+V_2)$, but only the rejected current ($rI$ amperes) from the second hot plate 32 at potential $-(V_1+V_2)$ will be completely absorbed by cold plate 37. A similar flow of current takes place in connection with the remaining cold plate 38 which will absorb the rejected current at potential of $-V_1$.

For reasons of simplicity in illustration only three hot plates are shown in Figure 2 and only one set of trajectories is shown for the rejected electrons from the first two hot plates 31 and 32. It will be understood that any desired number of hot plates may be used depending on the desired power output and/or the desired voltage and for each hot plate a corresponding cold plate and anode are employed.

The conductor 61 connecting cold plate 37 with hot plate 33 at the same potential and conductor 62 connecting cold plate 38 with hot plate 32 at the same potential conducts the current absorbed by cold plates 37 and 38, respectively, back to the hot plates 33 and 32. Thus, once a steady state of operation is achieved, current flows and continues to flow from the hot plate 31 and cold plate 36 through the conductors 52, 63 to the load 26 at a potential difference of $(V_1+V_2+V_3)$ volts, which is of the order of magnitude of $6kT_1$ volts; $k$ and $T_1$ have the values above noted. Such output of current will continue for the effective life of the electron emissive material, which in the case of the electron emissive materials hereinafter disclosed is of the order of a thousand hours of operation or more.

The magnetic field does zero net work in the process, except for secondary or small losses.

Negligible power is consumed in maintaining the anode potential, except for the last anode. The negligible anode power consumption is normally due to a small current leakage to the anodes caused by collision of electrons and gas molecules which are inevitably present in the space between the anodes and the hot plates even at the highest vacuum. Experimental results have shown that the anode current loss per unit of hot plate electron emissive area is less than 0.01% for gas pressures of $10^{-5}$ mm. mercury or less.

In the case of the last anode 48, however, a relatively large current flows thereto in comparison with the normal anode loss. This end-loss anode current is due to distortion of the electrostatic field at the last hot plate 33 and to reflection of electrons from the last cold plate 38. These reflected electrons move only in a direction towards the last anode 48. This end-loss anode current can be reduced to a small fraction of the power output of the device by utilizing a large number of hot and cold plates and/or by arranging them, for example, as shown in Figure 4.

It will be noted that the heat losses in the arrangement of the hot and cold plates of Figure 2 are much less than those in the arrangement of Figure 1, because the hot plates have been separated farther from the cold plates.

As noted above, Figure 3 shows an embodiment of the invention in which end effects and end-loss anode currents are eliminated completely, thus further increasing the net power output and thermal efficiencies. In Figure 3 substantially the same configuration of hot and cold plates is used, except that the plates are arranged in an arc or circle, the last cold plate being positioned adjacent to the first hot plate. Thus, the hot plates are 71, 72, 73, 74, 75, 76 and 77, arranged in a semi-circle, as shown in Figure 3. It will be noted that these plates are of gradually increasing arc widths; hot plate 71 is the narrowest and 77 the widest. The cold plates are 78, 79, 80, 81, 82, 83 and 84, arranged in the same circle as the hot plates with the widest cold plate 78 contiguous to the widest hot plate 77, and the narrowest cold plate 84 contiguous to the narrowest hot plate 71. Those hot and cold plates which are at the same negative potential are interconnected for return flow of current. Thus, conductor 85 connects the plates 72, 84; conductor 86 connects plates 73, 83; conductor 87 connects plates 74, 82; conductor 88 connects plates 75, 81; conductor 89 connects plates 76, 80; and conductor 91 connects plates 77, 79.

Conductors 92 and 93 lead, respectively, from the hot plate 71 and the cold plate 78 to the load 26.

A series of anodes 94 to 107, inclusive, is arranged concentric to the hot and cold plates hereinabove described, each anode being individual to a hot or cold plate, as the case may be, and being dimensioned substantially the same as the hot or cold plate with which it is associated. An electrostatic potential is applied to these anodes from a series of batteries 108 connected through conductors 109 with the anodes. As shown in Figure 3, the batteries are so connected with the anodes as to apply progressively larger potentials to pairs of anodes. Thus, the same potential is applied to anodes 94, 107; a still larger potential is applied to anodes 95, 106; a still larger potential is applied to anodes 96, 105, and so on, as shown in Figure 3, the largest potential being applied to the anodes 100, 101.

The assembly of anodes, hot and cold plates is positioned within a cylindrical housing 110 which is sealed and is under a high vacuum. A coil (not shown) surrounds the cylindrical housing 110 through which coil D.C. current is passed to create an axial magnetic field the flux lines of which are normal to the direction of the electrostatic field created by the potentials supplied to the anodes.

Due to the arrangement of hot and cold plates and anodes in Figure 3, the distortion of the electric field caused by end effects is eliminated completely. Electrons reflected by the last cold plate 84 will not flow to the anode and result in end-loss anode currents, but will recirculate in annular space 111 and will be eventually absorbed. The modification shown in Figure 4 accordingly results in a decrease in end-loss anode current with consequent increase of net power and of thermal efficiency.

In the embodiments hereinabove described all the hot plates are heated by any available source of heat to substantially the same elevated temperature and all the cold plates are maintained at a materially lower temperature, i.e., the temperature of all the cold plates is substantially the same. The invention, however, is not limited to such mode of operation but includes operation in which some or all of the electron emissive surface of a series of spaced surfaces are heated so as to maintain the surfaces of the series at gradually decreasing temperatures. One embodiment of this latter mode of operation is disclosed in Figure 4. In this figure is shown a series of six plates 120 to 125, inclusive; any desired number of such plates may be used. These plates, if desired, may be of gradually varying width. They have their side edges parallel to each other, as shown in Figure 4, and separated by a space 126 which preferably is made as small as possible and should be of a width the same as described in connection with space 15 of Figure 1.

Anodes 127 are associated with the plates 120 to 125, inclusive, with one anode individual to each plate and having about the same dimensions as the plate with which it is associated. These anodes are spaced from the plates substantially the same distance as hereinabove decribed in connection with the spacing between the anodes and associated hot and cold plates of the other modifications. Each anode has a positive potential impressed thereon by means of a battery 128; the battery connected to each plate is indvidually adjustable to apply different potentials to the various plates, the magnitude of which potential is disclosed hereinafter. The battery circuit includes a conductor 129 which is connected with the first hot plate 120 and the last plate 125 of the series.

The current generated by the embodiment of the invention shown in Figure 4 is taken off through the conductors 131 and 132 leading, respectively, from the plates 124 and 120 to the load 26. As in the other modifications, a magnetic field indicated by the reference character M is provided, the flux lines of which extend normal to the electrostatic field produced by the anodes 127. The series of plates and the associated anodes are enclosed in a sealed container which is under a high vacuum.

In the embodiment of the invention shown in Figure 4, the temperature varies continuously from the first plate 120 which it at the highest temperature to the last plate 125 which is at the lowest temperature; thus, no distinct hot or cold plates exist, but the heat propagates from the first plate 120 through succeeding plates to the last plate 125. The supply of heat to the first plate (preferably heat is supplied only to the first plate 120) and the dimensions and arrangement of the plates are controlled to insure a proper temperature differential between the first and the last plate and such that the temperature of plate 125 is low enough so that no appreciable emission of electrons from this plate takes place, but plate 125 acts to absorb electrons emitted from the preceding plates of the series.

The mode of operation diagrammatically illustrated in Figure 4 utilizes the heat supplied to the device at a series of temperature levels; hence, heat losses are reduced. Thermodynamic analysis shows that certain irreversibilities occur when electrons emitted from a plate at a high temperature are absorbed by a plate at a lower temperature. The gradual change of temperatures employed in the modification of Figure 4 results in a reduction of these irreversibilities with a consequent increase in thermal efficiency.

The anodes of all modifications disclosed may be of any suitable non-magnetic metal, e.g., steel, copper, silver, etc.

Any electron emissive material can be used in practicing this invention. Electron emissive materials which can be used are:

(1) Barium oxide, strontium oxide, calcium oxide, and mixtures of these oxides;
(2) Thoriated tungsten;
(3) Thoria, i.e., ceramic $ThO_2$;
(4) Philips cathodes, such as L-cathodes, a mixture of barium oxide, strontium oxide and tungsten;
(5) Molybdenum housing or stocking filled with granules of a fused barium oxide and aluminum oxide mixture;
(6) Lanthanum oxide ($La_2O_3$);
(7) Perforated molybdenum sleeve or housing containing sintered thorium oxide; and
(8) Pure tungsten.

The hot plates may be formed substantially entirely of the electron emissive materials above noted, or these materials may be fused or otherwise bonded onto a suitable carrier or support to form the electron emissive surfaces.

The hot electron emissive surfaces and the cold electron emissive surfaces may be of the same or different materials.

The hot plates or hot electron emissive surfaces made from oxides, such as barium oxide, strontium oxide, or calcium oxide, in operation, are preferably maintained at a temperature within the range of from 600° C. to 1000° C. and the cold plates made of or containing such oxides are maintained at a temperature within the range of from 20° C. to 300° C.

When employing thorium electron emissive materials, the temperature of the hot surfaces is maintained within the range of from 1000° C. to 1600° C. and the temperature of the cold surfaces within the range of from 20° C. to 700° C.

Utilizing Philips cathodes (L-cathodes) the hot surfaces are maintained within the range of from 800° C. to 1400° C. and the cold surfaces within the range of from 20° C. to 400° C.

In all cases the temperature to which the hot surfaces are subjected should be such that the rate of decomposition of the electron emissive surface at such temperature will not materially reduce their life.

It will be understood that in order to maintain the desired temperature differential a cooling medium may be employed to effect cooling of the cold surfaces. Also for maximum efficiency the waste heat may be regenerated. Thus, for example, where hot combustion gases are used to heat the hot plates, these gases leaving the hot plates may be passed in heat exchange relation with air, oxygen or fuel employed in producing the combustion gases to preheat this air, oxygen or fuel, thus beneficially utilizing the heat in the exhaust gases.

Any suitable source of heat may be used to heat the hot plates, for example, oil, coal, or natural gas may be burned to generate heat, nuclear heat sources, such as the heat available from reactors, or solar heat sources may be used. A.C. or D.C. current may be employed to generate the heat. Where A.C. current is used to generate the heat, the invention in effect converts the A.C. current to D.C. current with zero ripple and at any desired voltage. Utilizing D.C. current at a certain voltage as a source of heat, D.C. current with zero ripple and at any desired voltage within practical limits, is produced.

The hot electron emissive surface or surfaces may be heated by any desired mode of heat transfer, i.e., radiation, conduction, convection or condensation, or by any combination of two or more of these methods of heat transfer.

In the preferred embodiments of the invention the potential to which the anodes are subjected will depend on the strength of the magnetic field, the width of the plate with which the anode is associated and the intervening distance separating the anode and the plate with which it is associated. The preferred potential to which each anode may be subjected may be calculated from the following equation:

$$P=\frac{1}{11.446}M^2\frac{w}{2\pi}\left[2y-\frac{w}{2\pi}\right]$$

in which $P$=anode potential in volts
$M$=strength of the magnetic field in gausses
$w$=width of the corresponding plate in centimeters
$y$=distance from anode to plate in centimeters
$\pi$=Pi (3.1416)

For any given width of the first hot plate of a series consisting of $n$ plates ($n$ is an integer), the width of the subsequent plates in the series is preferably that indicated by the following equation:

$$\left(\frac{w_n}{w_1}\right)^3-\left[(2n-1)-2Zw_1\left(\frac{1}{w_2}+\frac{1}{w_3}+\cdots+\frac{1}{w_n-2}\right)\right]\frac{w_n}{w_1}+Z=0$$

in which $w_n$=width of $n$th plate in centimeters
$w_1$=width of plate 1 in centimeters
$w_2$=width of plate 2 in centimeters
$w_3$=width of plate 3 in centimeters
$Z=e^{-V_1/kT_1}$
$V_1$=potential difference between plates 1 and 2 in volts
$k$=Boltzmann's constant in electron volt per degrees absolute
$T_1$=temperature of hot plates in degrees absolute
$e$=Napierian base (2.71828 . . . )

In general within limits the greater the number of hot plates the more efficient the system and the greater the voltage output produced. Since there is a tendency of the electrons to accumulate and build up in the successive plates, this accumulation increasing with an increase in the number of plates used in the series, as a practical matter about 50 plates represent the practical maximum which can be used.

Figure 5 shows one embodiment of the invention in which groups of series of hot and cold plates are arranged in a parallelepiped housing 141, which housing is sealed and evacuated. In the case of a large installation, the housing may communicate with an efficient vacuum pump to maintain such vacuum therein at all times. The groups of series of hot and cold plates and associated anodes may be the same; accordingly, only one such group will be described. It will be understood, however, that any desired number may be employed, the number of such groups used depending on the desired power output.

Each group is enclosed within two layers of heat insulation 142, 143 which effectively insulates one group from the next group. Disposed between these two layers of insulation is a series of hot electron emissive surfaces, which in the embodiment shown in Figure 5 are in the form of blocks 144. Three such hot blocks are shown corresponding to the hot plates 31, 32 and 33 of Figure 2. Rods 145 traversing these blocks are good heat conductors but non-magnetic, such as aluminum or copper. A sleeve 146 of electric insulating material, such as a ceramic, quartz, etc., keeps these rods electrically insulated from the surrounding blocks of electron emissive material but permits the transfer of heat to the electron emissive surfaces. The ends of the rods 145 communicate with a header 147 provided with a heating fluid inlet 148 and an outlet 149. One such header 147 is provided at each of the opposite ends of the housing 141. Hot gases, such as combustion gases, hot vapors, liquid metal, fission products, etc. may be circulated through the header 147 supplying heat to the rods 145 which heat, by conduction and radiation, is imparted to the electron emissive surfaces 144.

Disposed adjacent the series of hot surfaces 144 is a series of cold surfaces 151 which correspond to the cold plates 36, 37 and 38 of Figure 2. Each of the cold surfaces 151 is provided with a heat conducting rod 152 electrically insulated from the electron emissive surface in which it is embedded by a ceramic or quartz insulator 153. The rods 152 communicate with headers 154 at opposite ends of the housing 141 through which any suitable cooling medium may be circulated. Spaced from the hot and cold electron emissive surfaces 144, 151 are anodes 155 which correspond with the anodes 43 to 48, inclusive, of Figure 2. These anodes are connected to batteries (not shown) to impress the desired potential thereon as hereinabove explained. For this purpose electric contacts 156 are provided on the side of the housing, which contacts are connected by suitable conductors with the anodes. These contacts permit connection of the external batteries to the anodes to impress the desired positive potential thereon.

It will be understood that certain of the cold electron emissive surfaces 151 are interconnected by conductors with the hot surfaces 144 corresponding to the connections shown in Figure 2 and that the first hot surface 144 of the series and the first cold surface of the series are provided with conductors connected with the power take-off electrical contacts 157, 158 provided in the side of the housing.

The housing 141 is surrounded by an electric coil 159 through which flows D.C. current to create a magnetic field normal to the existing electrostatic field.

Figures 6 and 7 show an embodiment of the invention in which, like in Figure 3, the hot and cold electron emissive surfaces and associated anodes are arranged in an arc or circle and groups of such series of hot and cold plates and associated anodes are positioned concentrically within a cylindrical housing 161. This housing is sealed and evacuated. Disposed at the lower half of this housing 161 at the opposite ends thereof are headers 162, each provided with an inlet 163 for a heating medium and an outlet 164. Each of the opposite ends of the upper half of housing 161 is provided with a header 165 having an inlet 166 and an outlet 167. Any suitable cooling medium may be circulated through the headers 165.

While Figure 6 shows a construction involving three concentric series of hot and cold plates and associated anodes, any desired number of such series may be used. These three series are indicated by reference characters A, B and C. Series A, B and C, except for the size of the parts in each series are substantially the same and the parts thereof are spaced and connected in the same manner as the hot and cold plates and associated anodes of Figure 3.

In Figure 6 the hot plates of series A are identified by reference numbers 171 to 176, inclusive, 171 being the narrowest and first plate of the series and each subsequent plate increasing in width and plate 176 being the widest. Spaced from each of these hot plates is an anode 177 on which a positive potential is impressed as hereinabove described. The anodes are separated from the hot plates 171 to 176 by space 178. Each hot plate has at its ends suitable heat conductors 179 which are electrically insulated from the hot plates by means of a ceramic or quartz sleeve; the conductors 179 communicate with the hot headers 162. In this way heat is imparted to the hot plates.

Cold plates 181 to 186, inclusive, are disposed in the same arc as the hot plates and are provided with heat conductors 187 which communicate with the cold headers 165 to effect cooling of the cold plates. Heat conductors 187 have electrical insulating sleeves thereon to insulate the cold plates relative to the heat conductors 187, yet permit the cooling of the cold plates. Anodes 188 are each individually associated with a cold plate and separated therefrom by space 189. Heat insulation 191 completely encloses series A and prevents or minimizes loss of heat to the housing 161 as well as preventing heat exchange between series A and series B. As series B and C have the same relative arrangement and construction as series A, it is believed unnecessary to describe series B and C.

A coil magnet 192 is positioned to create a magnetic field passing through housing 161; the flux lines of this magnetic field are substantially axial and also normal to the existing electrostatic field.

In the interests of clarity of illustration, the electrical connections and contacts are not shown in Figures 6 and 7. It will be understood that the housing is provided with contacts which are connected by electrical conductors with plates 171 and 191 and from which contacts the D.C. current generated may be taken off. The housing 161 is also provided with contacts (not shown) which are connected by conductors to the anodes and through which the desired positive potentials may be applied to the anodes. Also electrical conductors connect hot and cold plates at the same potential for return flow of current from the cold to the hot plates, as hereinabove described.

In the modification shown in Figure 8, the electron emissive surfaces are in the form of annulae, i.e., rings or cylinders rather than flat plates, as in Figure 2, or arced plates, as in Figure 3. Annulae 193, 194 and 195 of progressively increasing width having electron emissive material on their outer peripheries, constitute the hot electron emissive surfaces. Each annulus is separated from its adjacent annulus by a narrow space 196. Annulae 197, 198 and 199 of gradually diminishing width and each separated from an adjacent annulus by a space 201 constitute the cold electron emissive surfaces. Anodes 202 to 207, inclusive, each individual to and disposed concentric with a hot or cold electron emissive surface are connected through conductors 208 with a series of batteries 209. Batteries 209 are connected by means of conductors 208 with the anodes, as shown in Figure 8, so that the same and maximum positive potential is applied to anodes 204 and 205, the smallest potential is applied to anodes 202 and 207 and an intermediate potential is applied to anodes 203 and 206.

Annulae 195 and 198 are interconnected by conductors 211 for return flow of electrons from 198 to 195. Annulae 194 and 199 are interconnected by conductors 212 for return flow of electrons from 199 to 194. Power take off conductors 213 and 214 lead, respectively, from annulae 197 and 193 to load 26. The bank of batteries 209 is connected with conductor 214 by conductor 215.

A sealed cylindrical housing 216 encloses the annular hot and cold electron emissive surfaces. This housing is evacuated. A magnet is positioned on the outside of the housing to create a magnetic field therein, the flux lines of which are circular and concentric with the cylindrical housing, and thus normal to the electrostatic field emanating from the anodes 202 to 207, inclusive.

The operation of the device of Figure 8 is substantially the same as that of Figure 2, except that the electrons flow from one annulus to the next throughout the entire periphery thereof under the influence of the crossed magnetic and electrostatic fields. The D.C. current thus generated is taken off through conductors 213 and 214.

In all modifications, instead of the batteries a small portion of the D.C. power output may be used to create the electrostatic field. Also the showing of the batteries is schematic; it will be understood that each battery is adjustable to impress a desired and controlled potential on the anode to which it is connected.

It will be further understood the load 26 can be any desired equipment operated by D.C. current, such, for example, as a motor, resistance element, power circuit, etc.

It will be noted the present invention permits the utilization of a large number of electron emissive surfaces in a comparatively small volume. Large power outputs per unit volume can therefore be generated. On the basis of experimental results to date, it appears that power outputs as high as 5 kilowatts per cubic foot are attainable and this with high thermal efficiencies.

In that this invention can be embodied in apparatus which is simple in design, devoid of intricate parts, the parts do not require precise machining and are static, i.e., the apparatus does not involve any moving mechanical parts, the apparatus is of long useful life, efficient in operation, and relatively inexpensive to construct, maintain and operate.

The invention can be used to convert heat from any available high temperature heat source, including nuclear reactors, into electrical energy. It is particularly applicable for use as a nuclear power plant. Where A.C. current is used as the heat source, the present invention functions as a converter to transform the A.C. current to D.C. with zero ripple. It can be used to convert D.C. current at a given voltage to D.C. current with zero ripple at a higher or lower voltage.

Since different embodiments of the invention could be made without departing from the scope of this invention, it is intended that all matter contained in the above description or shown in the accompanying drawings shall be interpreted as illustrative and not in a limiting sense. Thus, while the specification shows solid electron emissive surfaces, the invention is not limited thereto but includes electron emissive surfaces which are in the liquid phase at operating temperatures.

What is claimed is:

1. A process of converting thermal energy into electrical energy, which comprises heating one of at least two spaced electron emissive surfaces to thus create a temperature differential between said surfaces, subjecting said surfaces to crossed electrostatic and magnetic fields subtantially normal to each other and taking off current from said surfaces.

2. A process of converting thermal energy into electrical energy, which comprises heating one of at least two electron emissive surfaces in closely spaced side-by-side relation, subjecting said surfaces to a unidirectional magnetic field and a positive electrostatic field, the flux lines of said magnetic field being substantially normal to said electrostatic field and taking off current from said surfaces.

3. A process of converting thermal energy into electrical energy, which comprises heating at least one of at least two electron emissive surfaces disposed in closely spaced relation to create a temperature differential between said surfaces, subjecting said surfaces to a positive electrostatic field and a unidirectional magnetic field substantially normal to each other while maintaining a vacuum in the region containing said surfaces and taking off current from said surfaces.

4. A process of converting thermal energy into electrical energy, which comprises heating an electron emissive surface, maintaining an electron emissive surface at a lower temperature than the first-mentioned surface and positioned to receive electrons from said first-mentioned surface, subjecting the flow of electrons from the first-mentioned surface to the second-mentioned surface to a positive electrostatic field to control the flow of said electrons, simultaneously subjecting said flow of electrons to a unidirectional magnetic field substantially normal to said electrostatic field to cause said electrons to flow from said first-mentioned surface to the second-mentioned surface and taking off current from said surfaces.

5. The process as defined in claim 4, in which said electron emissive surfaces comprise a material from the group consisting of barium oxide, strontium oxide, calcium oxide, thorium oxide, barium electron emissive material, strontium electron emissive material, aluminum oxide, lanthanum oxide and tungsten.

6. The process as defined in claim 4, in which said electron emissive surfaces comprise metallic oxides, the heated surface is maintained at a temperature within the range of from 600° C. to 1000° C. and the second-mentioned surface is maintained within the range of from 20° C. to 300° C.

7. The process as defined in claim 4, in which the electron emissive surfaces comprise thorium, the heated surface is maintained at a temperature within the range of from 1000° C. to 1600° C. and the second-mentioned surface is maintained at a temperature within the range of from 20° C. to 700° C.

8. The process as defined in claim 4, in which the electron emissive surfaces comprise a mixture of barium, strontium and tungsten, the heated surface is maintained at a temperature within the range of from 800° C. to 1400° C. and the second-mentioned surface is maintained at a temperature within the range of from 20° C. to 400° C.

9. A process of converting thermal energy into electrical energy, which comprises, subjecting two series of closely spaced electron emissive surfaces to unidirectional magnetic and positive electrostatic fields crossed substantially normal to each other while maintaining a temperature differential between the surfaces of one series as compared to the temperature of the surfaces of the other series, and withdrawing current from the first surface of both of said series.

10. The process as defined in claim 9, in which a vacuum is maintained in the region of said crossed unidirectional magnetic and electrostatic fields, the electron emissive surfaces comprise a metallic oxide and the first-mentioned series of said surfaces is maintained at a temperature within the range of from 600° C. to 1000° C. and the second-mentioned series of surfaces is maintained at a temperature within the range of from 20° C. to 400° C.

11. The process as defined in claim 9, in which a vacuum is maintained in the region of said electrostatic and unidirectional magnetic fields and said electrostatic field is of a strength and is so positioned relative to said electron emissive surfaces that under the influence of the magnetic field the electrons are caused to flow substantially entirely between said electron emitting surfaces.

12. A process of converting thermal energy into electrical energy, which comprises, subjecting a series of closely spaced electron emissive surfaces to unidirectional magnetic and postive electrostatic fields crossed substantially normal to each other while maintaining the said surfaces from the first to the last of said series under gradually decreasing temperatures, and withdrawing current from said surfaces.

13. Apparatus for converting thermal energy into electrical energy, comprising, at least two electron emissive surfaces, means for heating one of said surfaces, means for subjecting said surfaces to a positive electrostatic field, means for maintaining a unidirectional magnetic field, the flux lines of which are substantially normal to said electrostatic field in the region of said surfaces, and means for withdrawing current from said surfaces.

14. Apparatus for converting thermal energy into electrical energy, comprising, a first electron emissive surface, means for heating said first electron emissive surface, a second electron emissive surface positioned to receive electrons from said first-mentioned surface, means for subjecting the flow of electrons from the first-mentioned surface to the second-mentioned surface to an electrostatic field to accelerate the flow of said electrons, means for subjecting said flow of electrons to a unidirectional magnetic field substantially normal to said electrostatic field to cause said electrons to flow from said first-mentioned surface to the second-mentioned surface, and means for taking off current from said surfaces.

15. Apparatus for converting thermal energy into electrical energy, comprising, means for heating one of at least two electron emissive surfaces positioned in closely spaced relation to thus create a temperature differential between said surfaces, means for subjecting said surfaces to electrostatic and magnetic fields crossed substantially normal to each other, and means for taking off the resultant current from said surfaces.

16. Apparatus for converting thermal energy into electrical energy, comprising, at least two electron emissive surfaces disposed in closely spaced relation and maintained under vacuum, means for heating one of said surfaces to create a temperature differential between said surfaces, means for subjecting said surfaces to a positive electrostatic field, means for subjecting said surfaces to a unidirectional magnetic field substantially normal to said electrostatic field, and means for taking off current from said surfaces.

17. Apparatus for converting thermal energy into electrical energy, comprising, two series of closely spaced electron emissive surfaces, means for creating unidirectional magnetic and positive electrostatic fields in the region of said surfaces substantially normal to each other, means for heating one series of said surfaces to create a temperature differential between the surfaces of one series as compared to the temperature of the surfaces of the other series, and means for withdrawing current from the first surface of both of said series.

18. Apparatus for converting thermal energy into electrical energy, comprising, a series of closely spaced electron emissive surfaces in side-by-side relationship, a second series of closely spaced electron emissive surfaces in side-by-side closely spaced relationship, means for heating the electron emissive surfaces of the first series to create a temperature differential between the surfaces of the first series relative to those of the second series, means for creating a unidirectional magnetic field in the locality of said surfaces, means for creating a positive electrostatic field substantially normal to the flux lines of said magnetic field, whereby electrons from the initial surface of the first-mentioned series flow therefrom to a contiguous surface of said series and from each contiguous surface of said series to the next contiguous surface of said series, thus creating different negative potentials in said surfaces of the first series, and electrons flow from the last surface of the first series to the first surface of said second series and from each surface of said second series to the next contiguous surface of said second series, thus creating different negative potentials in the surfaces of said second series, certain of the surfaces of the second series having substantially the same negative potential as certain of the surfaces of the first series, means for connecting the surfaces of the two series at substantially the same negative potential for return of electrons from the second series of surfaces to the first series of surfaces, and means for taking off current leading from the initial surfaces of both series.

19. Apparatus as defined in claim 18, in which said series of the closely spaced electron emissive surfaces are disposed in a housing under a high vacuum in the region of said electron emissive surfaces.

20. Apparatus for converting thermal energy into electrical energy, comprising, a first series of electron emissive surfaces of gradually increasing width arranged in side-by-side closely spaced relation with the side edges substantially parallel, a second series of closely spaced electron emissive surfaces of gradually decreasing width arranged side by side in closely spaced relation with the side edges substantially parallel, a series of anodes disposed with an anode spaced from and individual to each electron emissive surface of both of said series, the space between said anodes and said electron emissive surfaces being under vacuum, means for creating a unidirectional magnetic field substantially normal to the electrostatic field created by said anodes in the space between said anodes and said electron emissive surfaces, said anodes being spaced from said electron emissive surfaces a distance such that electrons flowing from said emissive surfaces under the influence of said magnetic field will not reach the said anodes, means for impressing different potentials on said anodes with the potentials on those anodes positioned above the electron emissive surfaces of the first series gradually increasing and the potential on those anodes positioned above the electron emissive surfaces of the second series gradually decreasing in a direction from the initial surface of said series to the last surface of said series, certain of said electron emissive surfaces of both series having substantially the same negative potential, means connecting the electron emissive surfaces of both series having substantially the same potential, and electrical conductors in circuit with a load leading from the first electron emissive surface of both series.

21. Apparatus as defined in claim 20, in which groups of said series of electron emissive surfaces are disposed in a sealed housing under vacuum, each group being heat insulated from the adjacent groups.

22. Apparatus as defined in claim 20, having a sealed and evacuated cylindrical housing in which the two series of electron emissive surfaces are disposed in an arc with the anodes disposed in said housing in a second arc concentric with the first-mentioned arc.

23. Apparatus for converting thermal energy into electrical energy, comprising, a sealed and evacuated housing, a first set of headers on said housing for flow of a heating medium therethrough, a second set of headers on said housing for flow of a cooling medium therethrough, a series of electron emissive surfaces of progressively increasing width arranged in side-by-side closely spaced relation with the side edges substantially parallel and communicating with said set of headers for the supply of heat thereto, a second series of electron emissive surfaces of gradually increasing width disposed with the widest surface of said series positioned contiguous to the widest surface of the first-mentioned series and with the side edges of each surface of the second-mentioned series in closely spaced substantially parallel relation relative to the contiguous surface of said series, said second series of surfaces being communicably connected with the second set of headers for maintaining the temperature of the second series of electron emissive surfaces substantially below that of the first-mentioned series of electron emissive surfaces, a series of anodes disposed with one anode spaced from each of said electron emissive surfaces and individual thereto, each anode being of substantially the same width as the electron emissive surface with which it is associated, means for creating a unidirectional magnetic field in the space between said anodes and said electron emissive surfaces substantially normal to the electrostatic field created by said anodes, means for impressing a potential on said anodes, and electrical conductors in circuit with a load leading from the first electron emissive surface of both of said series.

24. Apparatus for converting thermal energy into electrical energy, comprising, a series of electron emissive surfaces, $P_0, P_1, P_2, P_3 \ldots P_n$ of gradually increasing width, $P_0$ being the narrowest and $P_n$ the widest, arranged side by side in closely spaced relation, a second series of electron emissive surfaces $P_0', P_1', P_2' \ldots P_n'$ of gradually decreasing width in which $P_0'$ is the widest and $P_n'$ is the narrowest, arranged in side by side closely spaced relation with surface $P_0'$ disposed adjacent a side edge of surface $P_n$ of the first-mentioned series, $n$ being any desired integer, electrical conductors connecting each surface of the first-mentioned series except surface $P_0$ with a surface except surface $P_0'$ of the second-mentioned series so that the surfaces $P_1, P_2, P_3 \ldots$ of the first-mentioned series are connected respectively with the surfaces $P'_n, P'_{n-1}, P'_{n-2} \ldots$ of the second-mentioned series, means for creating a unidirectional magnetic field in the region of said surfaces, a series of anodes of different widths, each of which is individual to one of said electron emissive surfaces and of the same width as the electron emissive surface with which it is associated, means for subjecting said anodes to different potentials, the potential to which each anode is subjected being proportional to that of the electron emissive surface with which it is associated, said series of electron emissive surfaces and said anodes being under vacuum and the electrostatic field created by said anodes being substantially normal to said magnetic field, and electrical conductors in circuit with a load leading from said electron emissive surfaces $P_0$ and $P_0'$.

25. Apparatus as defined in claim 24, in which groups of said series of electron emissive surfaces are arranged in a sealed housing under vacuum, and the said series of each group is insulated from those of the other groups.

26. Apparatus as defined in claim 24, in which the first-mentioned and second-mentioned series are arranged in an arc, a plurality of such series is employed with the respective arcs formed by each arrangement of a first-mentioned and second-mentioned series disposed in concentric relation, and all of said series are disposed in a sealed cylindrical housing maintained under vacuum.

27. A process of converting thermal energy into electrical energy, which comprises heating one of at least two electron emissive surfaces in spaced relation, subjecting said surfaces to a magnetic field substantially parallel to said surfaces and an electrostatic field substantially normal to said magnetic field, and taking off current from said surfaces.

References Cited in the file of this patent

UNITED STATES PATENTS

| 2,638,555 | Marks | May 12, 1953 |
| 2,759,112 | Caldwell | Aug. 14, 1956 |

FOREIGN PATENTS

| 989,296 | France | May 23, 1951 |
| 878,521 | Germany | June 5, 1953 |